CONTROL APPARATUS HAVING SIGNAL PROCESSING THROUGH PLURAL CHANNELS

Filed July 24, 1967

INVENTORS
ROBERT G. CLAPHAM
ILMAR G. RAUDSEP
BY Bruce C Lutz
ATTORNEY

Jan. 26, 1971 I. G. RAUDSEP ET AL 3,559,171
CONTROL APPARATUS HAVING SIGNAL PROCESSING THROUGH PLURAL CHANNELS
Filed July 24, 1967 2 Sheets-Sheet 2

| TIME PERIOD IN COMMUTATION CYCLE | 1 | 2 | 3 | 4 | 5 | 6 |
|---|---|---|---|---|---|---|
| TRANSDUCER DESIGNATION | RECEIVER DESIG. | | | | | |
| 10 | 16 | 18 | 20 | 20 | 16 | 18 |
| 12 | 18 | 20 | 16 | 18 | 20 | 16 |
| 14 | 20 | 16 | 18 | 16 | 18 | 20 |

INVENTORS
ROBERT G. CLAPHAM
ILMAR G. RAUDSEP
BY Bruce C Lutz
ATTORNEY

United States Patent Office 3,559,171
Patented Jan. 26, 1971

3,559,171

CONTROL APPARATUS HAVING SIGNAL PROCESSING THROUGH PLURAL CHANNELS

Ilmar G. Raudsep and Robert G. Clapham, Seattle, Wash., assignors to Honeywell Inc., Minneapolis, Minn., a corporation of Delaware Filed July 24, 1967, Ser. No. 655,663
Int. Cl. H04q 5/00
U.S. Cl. 340—147 7 Claims

ABSTRACT OF THE DISCLOSURE

Apparatus and method for minimizing the effect of signal transmission variations caused by variations in a plurality of parallel ideally identical signal processing channels. The apparatus comprises means for periodically switching the signal between different channels so that it is processed by each channel for equal periods of time.

This invention is generally related to electronic circuitry and more specifically is related to circuitry wherein a plurality of signals are to be processed in the same and in which the processing circuits although ideally identical may have individual variations over a period of time.

In the prior art, many situations have arisen wherein substantially identical processing circuitry is required to identically process a plurality of individual signals. In the past, individual variations in processing circuitry had to be "lived with" or else the circuitry had to be designed so that the variations in time were inconsequential. Another solution was to provide feedback to keep variations within limits or to alter characteristics relatively constant by feedback adjusting means. These solutions were generally unsatisfactory and often were expensive.

The present invention on the other hand uses a commutation technique to periodically switch a plurality of input signals to a plurality of processing circuits so that a given signal is processed by each processing circuit for an equal period of time.

The solution is more ingenious than appears on first glance since one of the signals being processed has to be compared with each of the other two of the three signals. Thus, the signals cannot be merely commutated between each of the three receivers consecutively because this will not provide opposing equal time periods in each of the pairs of receivers for a given pair of signals.

The present invention, therefore, has eliminated errors due to processing circuit variations and further has solved this problem where one signal must be compared with two other signals as a specific application.

It is therefore an object of this invention to provide improved performance from processing circuitry where a plurality of signals are to be processed by circuitry having ideally identical characteristics.

Figure 1A:
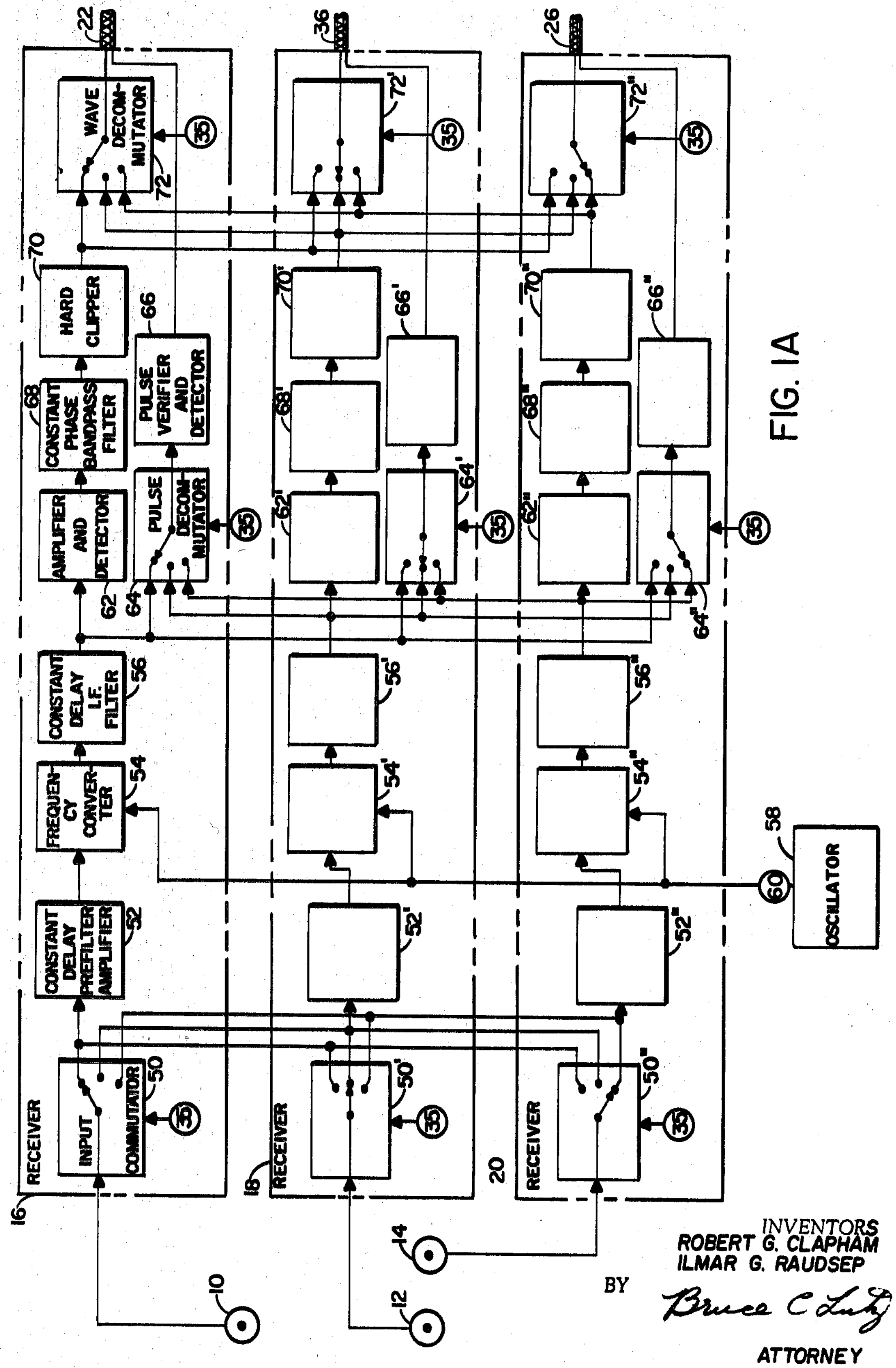
Figures 1B, 2:
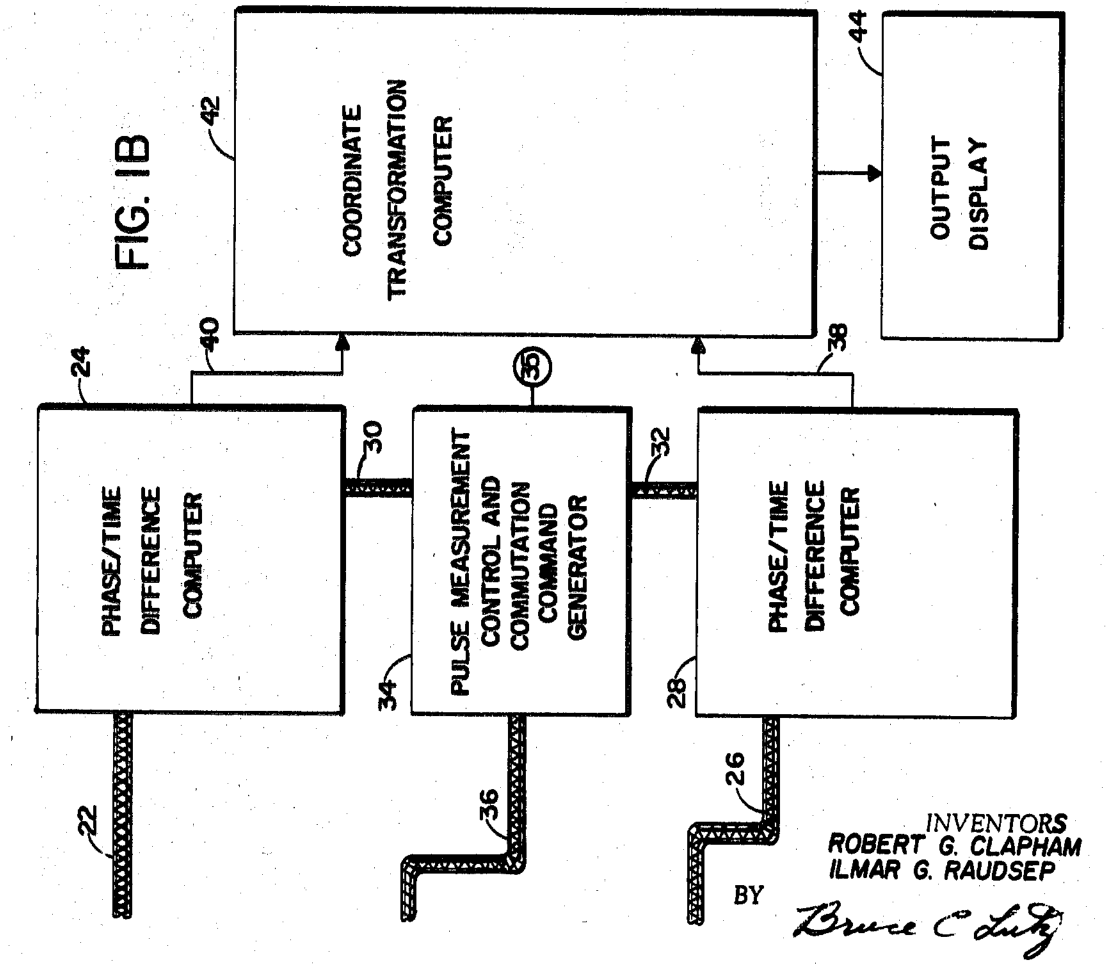

Other objects and advantages of the present invention will be apparent from a reading of the specification and appended claims in conjunction with the drawings wherein:

FIGS. 1A and 1B are block diagrams showing a system utilizing one embodiment of the commutation technique; and FIG. 2 is a chart illustrating the manner in which commutation occurs for this specific embodiment.

Referring to FIG. 1 it will be noted that there are three signal sources (for this embodiment, the signal sources are three hydrophones or acoustic-to-electrical transducers) 10, 12 and 14 connected respectively to receivers or processing circuits 16, 18 and 20. Each of the receivers processes the signals from the transducers and each is identical in the contents of the block. A cable 22 represents connections between receiver 16 and a phase/time difference computer 24. A cable 26 represents connections between receiver 20 and another phase/time difference computer 28. Cables 30 and 32 respectively connect computers 24 and 28 with a pulse measurement control and commutation command generator 34 which has a commutation control signal output 35. A cable 36 connects receiver 18 with the generator 34. Each of the cables merely represent connections from various points. As an example, some of the connections in cable 30 are connected directly to connections within cable 22 so as to connect the receiver 16 to the generator 34. Further, some of the connections in cable 30 are for the purpose of connecting receiver 18 to computer 24. Connections 38 and 40 are utilized to connect computers 28 and 24 respectively to a coordinate transformation computer 42 which is in turn connected to an output display 44.

Further information as to the contents of the various blocks and the individual connections may be obtained from a copending application in the name of Ilmar G. Raudsep, Ser. No. 655,662, filed on July 24, 1967, now abandoned in favor of continuation-in-part Ser. No. 741,-191, filed June 28, 1968, both applications assigned to the same assignee as the present invention.

The transducer 10 is connected to a three position input commutator means 50 within receiver 16 having a further input 35 which is connected to output 35 of generator 34. A first output of commutator 50 is connected to a constant delay prefilter and amplifier means 52. An output of amplifier means 52 is fed through a frequency converter means 54 to a constant delay IF filter means 56. Converter 54 also receives an input from an oscillator 58 via a terminal 60. Mixing of a signal from the signal source 10 and from the oscillator means 58 produces an intermediate frequency which is filtered through filter 56. An output from filter 56 is applied both to an amplifier and detector means 62 and also to a three position pulse decommutator means 64. An output from the pulse decommutator 64 is applied through a pulse verifier and detector means 66 to the cable 22. An output of the detector means 62 is applied through a constant phase band pass filter means 68 and a hard clipper means 70 to a three-position wave decommutator means 72. An output of the wave decommutator 72 is also applied to cable 22.

The components of the other two receivers or processing circuits 18 and 20 have not been labeled, but have been given blocks with identical designations. As will be noted, each of the commutators 50 have the same output terminals connected together and to the processing circuitry within receiver 16, 18 or 20 depending upon the presently shown connection of the switch within the commutator 50. As will be realized, the schematic showing of the position of the commutator switch 50 is merely representative and may be replaced by various types of analog gates and logic switching circuitry. The same is true for the docommutators 64 and 72.

In FIG. 2 a chart is shown with a commutation cycle divided up into 6 equal time periods and designated 1 through 6. Further, the transducers are designated as 10, 12 and 14. The chart attempts to show during each time period the receivers through which the signal from a given transducer is flowing or being processed. As an example, the signal paths during consecutive time periods 1–6 for the signal from transducer 10 are through receivers 16, 18, 20, 20, 16, and 18. As will be noticed, for two consecutive time periods 3 and 4, the signal from transducer 10 is processed by receiver 20. Likewise, for transducer 12, the signal therefrom is processed consecutively in receivers 18, 20, 16, 18, 20 and 16. For the same consecutive time periods as mentioned above the transducers 10 and 12, the signal from transducer 14 is consecutively processed in receivers 20, 16, 18, 16, 18, and 20.

In the operation of the system, the phase/time difference computer 24 measures the time and phase difference of signals obtained from transducers 10 and 12. These signals are processed in receivers 16 and 18 and individual variations may show up in the filters and/or amplifiers such as 52, 56, 62 and 68. As will be realized, if the circuitry of receiver 16 changes the phase of signals being processed by a different amount than the phase is changed in receiver 18, there will be an error in the signal phases as measured by the phase difference computer 24. Thus, a commutation scheme might be utilized wherein the signals from transducers 10 and 12 are merely consecutively reversed between receivers 16 and 18. Another receiver not shown could be used and connected to transducer 12 to provide two signals to computer 28 with commutation between this receiver and receiver 20 connected to transducer 14. However, this would necessitate four receivers and provide for additional expense. The present system eliminates one receiver while still processing not only each signal in each receiver for a like amount of time, but also so that each pair of signals being compared is processed in each pair of receivers in every combination. In other words, referring to FIG. 2, the pair of signals from transducers 10 and 12 are applied to receivers 16 and 18 in one manner in time period 1 and are sent through the same two receivers in the opposite sense in time period 6. The pair of signals from transducers 12 and 14 on the other hand are applied through receivers 18 and 20 in time period 1 and are processed by the same two receivers in the opposite sense in time period 5. As can be determined, if only three time periods are used, the individual signals are commutated to obtain an average, but the receiver phase difference errors of pairs of signal are not averaged out to zero. Thus, the signals supplied from computers 24 and 28 to computer 42 if the receivers 16, 18, and 20 are not identical in phase shift and if the presently described method of commutation is not used will be correct.

As a supplement to the above description, the following formula may serve to enhance understanding of the problem and the solution. The part of the output signal from hydrophone 10 may be represented simply by $$\sin\ (\omega_m t+\phi_{10})$$

and the corresponding output of hydrophone 12 by $$\sin\ (\omega_m t+\phi_{12})$$

The phase difference $\Delta d_x$ that ideally should be determined is defined by $$\Delta d_x = d_{10} - d_{12}$$

The phase shifts in the receivers 16 and 18 can be denoted by $\phi_{16}$ and $\phi_{18}$.

Then phase difference, $\Delta\phi'_x$, measured by the phase computer 24 is $$\Delta\phi'_x = (\phi_{10}+\phi_{16}) - (\phi_{12}+\phi_{18})$$

or $$\Delta\phi'_x = (\phi_{10}-\phi_{12}) + (\phi_{16}-\phi_{18})$$

The term in the last parentheses is obviously a potential source of error and in a practical system is initially minimized by adjusting $\phi_{16}$ and $\phi_{18}$ until they are equal and their effect is canceled. Over long periods of time, however, individual receiver phase characteristics can change as previously indicated and cause a phase error to be reintroduced. As previously implied, the present invention is used to eliminate the need for frequent recalibration. As shown, the signal from hydrophone 12 is always subtracted from the signal from hydrophone 10 in computer 24 due to the fact that the decommutation networks 66 and 72 always route the signal from a particular hydrophone back to the same input of the phase computer. However, if the signals are changed so that the signal from hydrophone 10 is routed through receiver 18 and the signal from hydrophone 12 is routed through receiver 16, the following $\Delta\phi''_x$ will occur:

$$\Delta\phi''_x = (\phi_{10}-\phi_{12}) + (\phi_{18}-\phi_{16})$$

If the output of the phase computer is now averaged over both periods, the average output, $\overline{\Delta d_x}$, is given by $$\overline{\Delta d_x} = \tfrac{1}{2}\,[2(\phi_{10}-\phi_{12}) + (\phi_{16}-\phi_{18}) + (\phi_{18}-\phi_{16})]$$

and the contributions of the receiver phase shifts defined by the quantities in the last two parentheses on the right hand side of the equation cancel out.

While not a part of the present invention, it may be noted that the signals are changed to digital or binary form by the time they leave blocks 66 and 70.

Further, the apparatus receives a unique signal which has a predetermined portion thereof that comprises a periodic pulse. The generator 34 senses this pulse and provides for the commutation switching to occur just prior to the time of occurrence of the succeeding pulse so that the commutation does not interfere with signal phase measurement.

While the present invention illustrates a specific six time period commutation cycle for use with three signals and three receivers, the invention is not limited to this particular embodiment and number of signal sources and we intend to be limited only by the scope of the appended claims.

We claim:

1. In an electronic system subject to individual circuit variations of identically constructed circuits comprising, in combination:
- first, second and third signal sources for supplying first, second and third signals to be processed;
- first, second and third substantially identical processing circuits subject to individual characteristic variations with time;
- first, second and third output means for providing said signals as outputs after processing by said circuits; and
- means connecting said circuits between said sources and said output means for commutating said signals so that each signal is processed in each of said circuits for substantially the same length of time.

2. Apparatus as claimed in claim 1 wherein the means for commutating has a commutation cycle which comprises six time periods and referring consecutively to the same time periods for each signal the first signal is processed consecutively in the first, second, third, third, first and second circuits, the second signal is processed consecutively in the second, third, first, second, third and first circuits and the third signal is processed consecutively in the third, first, second, first, second and third circuits.

3. Apparatus as claimed in claim 2 wherein said means connecting said circuits to said output means includes decommutation means so that each processed signal is returned to an output means corresponding to an individual one of said signal sources.

4. Apparatus as claimed in claim 1 wherein said last named means comprises three switching means each having three positions and each being connected to a different one of said processing circuits at a given time.

5. Apparatus as claimed in claim 4 wherein said switching means are commutating means and are connected between said signal sources and said circuits and wherein three additional three position switching means for decommutation are connected between said circuits and said output means so that each of said output means receives signals from the corresponding one of said signal sources.

6. A system for processing signals comprising, in combination:
- first, second and third signal sources for supplying first, second and third signals respectively;
- first, second and third substantially identical processing circuits the charactreistics of which may individually vary with time;

first comparison means for comparing said first and seond signals;

second comparison means for comparing said second and third signals; and switch means connecting said processing circuits in parallel between said signal sources and said comparison means for periodically changing the processing circuit through which signals from a given source travel such that the signals are processed in each processing circuit for substantially identical time periods.

7. A method for minimizing the effects of signal transmission errors in a system in which first, second, and third input signals are processed through first, second, and third parallel ideally identical processing channels, and in which the second signal is then compared with the first and third signals, said method comprising the steps of:

switching said first signal so that it is sequentially processed in six equal time periods in the first, second, third, third, first and second channels;

switching said second signal so that it is sequentially processed in said time periods in the second, third, first, second, third and first channels; and switching said third signal so that it is sequentially processed in said time periods in the third, first, second, first, second and third channels.

References Cited

UNITED STATES PATENTS 3,228,001 1/1966 Herzl -------------- 340—149

HAROLD I. PITTS, Primary Examiner

U.S. Cl. X.R.

340—149, 151, 163